W. P. WOLFINGTON.
Harness-Trees.
No. 158,817.
Patented Jan. 19, 1875.
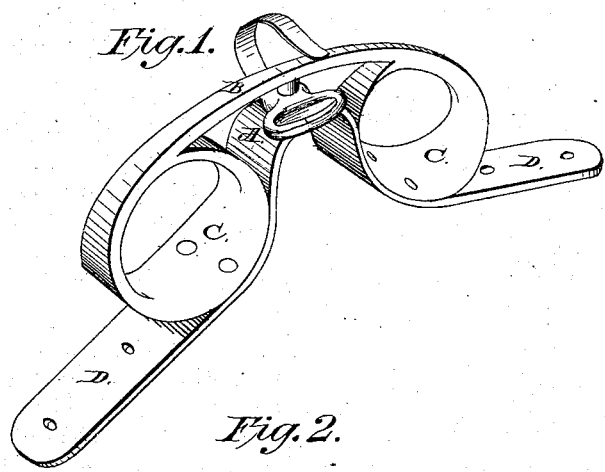
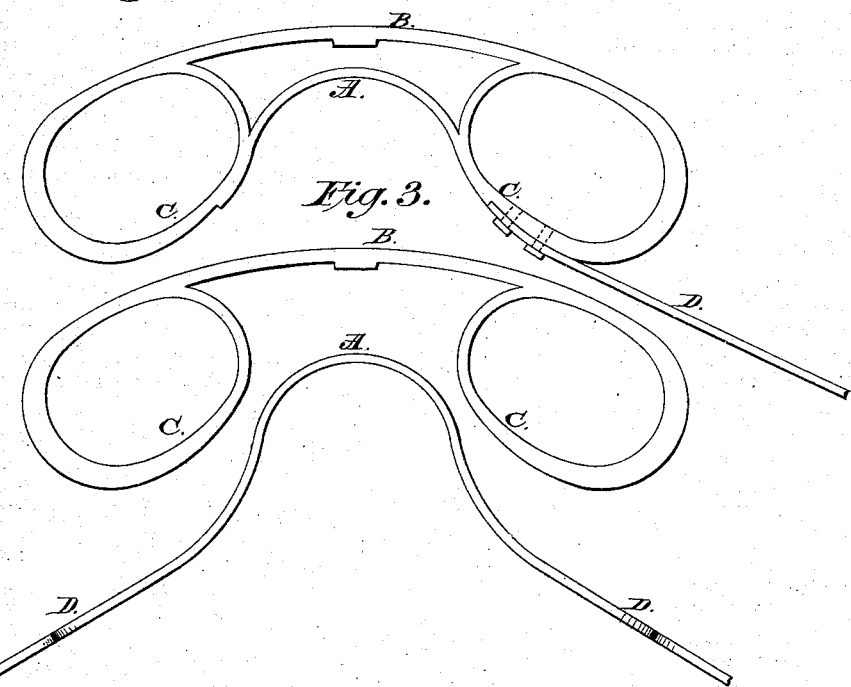

UNITED STATES PATENT OFFICE.

WILLIAM P. WOLFINGTON, OF LOUISVILLE, KENTUCKY.

IMPROVEMENT IN HARNESS-TREES.

Specification forming part of Letters Patent No. 158,817, dated January 19, 1875; application filed July 2, 1874.

*To all whom it may concern:*

Be it known that I, WILLIAM P. WOLFINGTON, of the city of Louisville, in the county of Jefferson and State of Kentucky, have invented a new and Improved Harness Tree or Pad, of which the following is a correct specification:

The object of my invention is to produce a cheaper and stronger tree, requiring less and simpler labor to trim, than those in use at present.

The nature of my invention consists in forming a tree so as to constitute a double bridge over the horse's back, terminating in and forming terrets or line-loops.

To enable those skilled in the art to make and use my invention, I will proceed to describe its construction, reference being had to the accompanying drawings which constitute a part of this specification, in which—

Figure 1 is a perspective view, and Figs. 2 and 3 sectional views.

With the exception of the hook, my tree may be cast in one piece; but, as durability is one of the main objects, it is at least necessary to make it as shown in Fig. 2, where wrought-iron prolongations are riveted to the under side of the line-loops, for they, requiring to be thin, must be of tough metal. But, considering the difficulty of dressing the metals, it is best to make it as shown in Fig. 3, where A is a thin plate, having the contour of the horse's back; and C C are the terrets or line-loops, in the form of rings. These rings are connected by a bridge, B, being cast with them, thus connecting them over the horse's back. The plate A and loops C C, being finished, are riveted together. The loops, having the same lateral width as the plate, cover it where the contact is made. The points D D of the plate extend out a sufficient distance from the loops to admit of riveting thereto the jockey-flaps or bearing-straps, whose ends are concealed in the scallop formed by the junction of the loops and plate, the points being reduced in width, so as to admit of stitching on jockeys having the same width as the plate and base of the line-loop at its junction therewith.

My tree, thus made, has a double bridge over the backbone from the under and upper side of the line-loops; but between the upper and lower bridge-pieces I place a combined hook and crupper loop, through which is passed a screw from the under side into the upper bridge-piece, thus binding them together and giving great strength, and yet permitting the hook to be taken out at will, and allowing it to move laterally, thereby reducing its liability to break.

Now, to make a saddle on my tree it is only necessary to rivet the flap and back-band to the points, then stitch on a small jockey, and add the usual housings, and it will answer for both single and double harness.

I claim—

A harness-tree having line-loops C C, connected together by bridges A and B, and provided with projecting pieces D D, substantially as and for the purpose set forth.

W. P. WOLFINGTON.

Witnesses:
   R. M. DENNIS,
   JOS. B. GATHRIGHT.